US011805737B2

(12) United States Patent
Larkins

(10) Patent No.: US 11,805,737 B2
(45) Date of Patent: *Nov. 7, 2023

(54) VEGETATION HANGER

(71) Applicant: DriFlower, LLC, Ashland, OR (US)

(72) Inventor: Todd Chandler Larkins, Ashland, OR (US)

(73) Assignee: DriFlower, LLC, Ashland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,075

(22) Filed: Dec. 22, 2021

(65) Prior Publication Data

US 2022/0110264 A1 Apr. 14, 2022

Related U.S. Application Data

(63) Continuation of application No. 16/930,522, filed on Jul. 16, 2020, now Pat. No. 11,350,574.

(Continued)

(51) Int. Cl.
*A01F 25/12* (2006.01)
*A47G 7/04* (2006.01)
(Continued)

(52) U.S. Cl.
CPC .............. *A01F 25/12* (2013.01); *A47G 7/04* (2013.01); *A47F 7/0078* (2013.01); *A47G 25/1471* (2013.01); *A47G 25/28* (2013.01)

(58) Field of Classification Search
CPC ........ A47G 25/10; A47G 25/14; A47G 25/28; A47G 25/30; A47G 7/04; A47G 25/1457;
(Continued)

(56) References Cited

U.S. PATENT DOCUMENTS 941,448 A 11/1909 Haglund
945,729 A 1/1910 Rangnow
(Continued)

FOREIGN PATENT DOCUMENTS

CA 2458956 A1 9/2004
CN 201533508 U 7/2010
(Continued)

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.
(Continued)

*Primary Examiner* — Devin K Barnett
(74) *Attorney, Agent, or Firm* — Carter, DeLuca & Farrell LLP; George Likourezos

(57) ABSTRACT

A vegetation hanger includes a hanger portion and a crossbar. The hanger portion includes a first aperture, a stem, and a base. The first aperture is configured for handling of the vegetation hanger. The stem includes a first end portion and a second end portion. The stem extends from the first end portion towards the second end portion and defines a second aperture configured for hanging of the vegetation hanger. The crossbar is coupled to the hanger portion and defines a linear plate having a first edge, a second edge, a first end portion, and a second end portion.

17 Claims, 4 Drawing Sheets

Related U.S. Application Data

(60) Provisional application No. 62/874,939, filed on Jul. 16, 2019.

(51) Int. Cl.
*A47G 25/28* (2006.01)
*A47G 25/14* (2006.01)
*A47F 7/00* (2006.01)

(58) Field of Classification Search
CPC .... A47G 25/1471; A47G 25/18; A47G 7/044; A47G 7/045; A47G 7/047; A47G 25/743; A47G 25/005; A47G 25/0692; A47G 25/32; A47G 25/34; A47G 25/36; A47G 25/48; A47G 25/50; A01F 25/12; B29L 2031/735; A01G 9/024; A24B 1/00; A24B 1/02; A24B 1/08; A47F 5/00; A47F 5/0006; A47F 7/00; A47F 7/0078; A47F 7/08
See application file for complete search history.

(56) References Cited

U.S. PATENT DOCUMENTS

| | | |
|---|---|---|
| 1,321,997 A | 11/1919 | Duberstein |
| 1,515,078 A | 11/1924 | Sheee |
| 1,833,388 A | 11/1931 | Carmack |
| 1,868,638 A | 7/1932 | Mackey |
| 2,037,971 A | 4/1936 | Ferren |
| 2,099,596 A * | 11/1937 | Bruening ............... A47G 25/34 40/322 |
| 2,150,869 A | 3/1939 | Shafarman |
| 2,279,777 A | 4/1942 | Dean |
| 2,289,729 A | 7/1942 | Robinson et al. |
| 2,411,856 A | 12/1946 | Harding |
| 2,484,449 A | 10/1949 | Fetterman |
| 2,546,929 A | 3/1951 | Nampa |
| 2,580,193 A | 12/1951 | Richterkessing |
| 2,586,913 A | 2/1952 | Burns |
| 2,634,031 A * | 4/1953 | Klein ................ A47G 25/743 211/60.1 |
| 2,671,938 A | 3/1954 | Roberts |
| 2,692,711 A | 10/1954 | Norris et al. |
| 2,716,513 A | 8/1955 | Braunstein |
| 2,828,897 A | 4/1958 | Gordon |
| 2,929,514 A | 3/1960 | Stewart |
| 3,131,817 A | 5/1964 | Schenkler |
| 3,194,458 A | 7/1965 | Bennett |
| D202,954 S | 11/1965 | Hanson |
| 3,346,150 A | 10/1967 | Clopton |
| D210,333 S | 2/1968 | Apy |
| 3,535,808 A | 10/1970 | Morrish |
| 3,606,948 A | 9/1971 | Strang |
| 3,874,572 A | 4/1975 | McClenning |
| D236,572 S | 9/1975 | Ostroll |
| D264,912 S * | 6/1982 | Bliss ............................ D6/326 |
| 4,440,369 A | 4/1984 | Banks |
| 4,703,878 A | 11/1987 | Louw |
| 4,717,053 A | 1/1988 | Wang |
| 4,724,967 A | 2/1988 | Valiulis |
| 4,793,531 A | 12/1988 | Blanchard et al. |
| 4,845,602 A | 7/1989 | Lehocki |
| 4,881,342 A | 11/1989 | Ferguson |
| 5,007,562 A | 4/1991 | Brink et al. |
| 5,074,445 A | 12/1991 | Chen |
| 5,129,524 A | 7/1992 | Holman |
| D331,425 S | 12/1992 | Rhyne |
| D332,180 S | 1/1993 | Marshall et al. |
| 5,329,728 A | 7/1994 | Ray |
| 5,333,409 A | 8/1994 | Mendes |
| 5,361,949 A | 11/1994 | Petrou |
| 5,388,354 A | 2/1995 | Marshall et al. |
| D357,813 S | 5/1995 | Koresko |
| 5,520,311 A | 5/1996 | Lam |
| 5,535,927 A | 7/1996 | Garrison |
| 5,544,765 A | 8/1996 | Farbman |
| 5,581,936 A | 12/1996 | Belgiorno |
| 5,813,092 A | 9/1998 | Greenfield et al. |
| 5,826,759 A | 10/1998 | Ohsugi |
| 5,868,289 A | 2/1999 | Lee |
| 5,884,422 A | 3/1999 | Marshall et al. |
| 6,047,867 A | 4/2000 | Heiber |
| 6,132,305 A | 10/2000 | Witherell |
| 6,264,077 B1 * | 7/2001 | Kolton ................. A47G 25/743 223/87 |
| 6,298,600 B1 | 10/2001 | Feldman |
| 6,340,238 B1 | 1/2002 | Pan |
| 6,349,863 B1 | 2/2002 | Frye |
| 6,389,744 B1 | 5/2002 | Pugh |
| 6,641,105 B1 | 11/2003 | Hamerski |
| 6,659,295 B1 | 12/2003 | De Land et al. |
| 6,811,064 B2 | 11/2004 | Salem |
| 6,817,497 B2 | 11/2004 | Grasso et al. |
| D502,756 S | 3/2005 | Birdwell et al. |
| 6,863,197 B1 | 3/2005 | Dirlam et al. |
| 7,015,815 B1 | 3/2006 | Feibelman |
| 7,178,705 B1 | 2/2007 | Sutton |
| 7,377,409 B1 | 5/2008 | Brown |
| 7,774,977 B2 | 8/2010 | Miller Shelton |
| 7,984,585 B1 | 7/2011 | Wu |
| 8,276,714 B2 | 10/2012 | Broyles |
| D711,123 S | 8/2014 | Birge |
| 9,113,736 B1 | 8/2015 | Antler |
| D772,584 S | 11/2016 | Debus |
| 9,782,031 B2 * | 10/2017 | Debus .................... A47G 25/28 |
| D806,410 S | 1/2018 | Denby et al. |
| D853,737 S | 7/2019 | Wolfe |
| D867,770 S | 11/2019 | Wright |
| 2002/0184799 A1 | 12/2002 | Chou |
| 2004/0226971 A1 | 11/2004 | Detten |
| 2005/0035159 A1 | 2/2005 | Hunt et al. |
| 2005/0139625 A1 | 6/2005 | Gouldson |
| 2005/0189383 A1 | 9/2005 | Weal et al. |
| 2006/0032130 A1 | 2/2006 | Lifters et al. |
| 2006/0226179 A1 | 10/2006 | Hsu |
| 2007/0266627 A1 | 11/2007 | Shelton |
| 2008/0236041 A1 | 10/2008 | Carpenter |
| 2008/0283558 A1 | 11/2008 | Rude et al. |
| 2011/0247185 A1 * | 10/2011 | Bolden ................ A47G 25/005 24/716 |
| 2011/0284597 A1 | 11/2011 | Kaleta et al. |
| 2012/0132679 A1 | 5/2012 | Gouldson |
| 2013/0015215 A1 | 1/2013 | Coote |
| 2013/0221041 A1 | 8/2013 | Wittenstein et al. |
| 2014/0246464 A1 | 9/2014 | Zhong |
| 2014/0367425 A1 | 12/2014 | Laibe |
| 2016/0058210 A1 | 3/2016 | Strassburger et al. |
| 2016/0223137 A1 | 8/2016 | Ochipa |
| 2017/0105362 A1 | 4/2017 | Irving, Jr. |
| 2017/0238731 A1 | 8/2017 | Davies |
| 2017/0325614 A1 | 11/2017 | Baltz |
| 2018/0087293 A1 | 3/2018 | Strassburger et al. |
| 2018/0103785 A1 | 4/2018 | Goldman et al. |
| 2018/0160833 A1 | 6/2018 | Ho |
| 2018/0303263 A1 | 10/2018 | Jones et al. |
| 2018/0317685 A1 | 11/2018 | Boles |
| 2018/0325299 A1 | 11/2018 | Clark et al. |
| 2018/0356028 A1 | 12/2018 | Fang |
| 2019/0014936 A1 | 1/2019 | Beyda et al. |
| 2019/0307264 A1 | 10/2019 | Carr et al. |
| 2019/0380522 A1 | 12/2019 | Johansson |
| 2020/0085221 A1 | 3/2020 | Riedel et al. |
| 2020/0128988 A1 | 4/2020 | Moore et al. |
| 2020/0245796 A1 | 8/2020 | Gilbert |

FOREIGN PATENT DOCUMENTS

| | | |
|---|---|---|
| CN | 105474854 | 4/2016 |
| CN | 205667333 U | 11/2016 |
| CN | 206611910 U | 11/2017 |
| CN | 107896731 A | 4/2018 |
| CN | 208864010 U | 5/2019 |
| DE | 3246174 C2 | 1/1994 |

(56) References Cited

FOREIGN PATENT DOCUMENTS

| | | | |
|---|---|---|---|
| FR | 2464638 | A1 | 3/1981 |
| FR | 3062120 | A1 | 7/2018 |
| JP | 2008092939 | A | 4/2008 |
| JP | 4218802 | B2 | 2/2009 |
| JP | 4399093 | B2 | 1/2010 |
| JP | 2011010890 | A | 1/2011 |
| KR | 20-2005-0002675 | A | 1/2005 |
| KR | 2003821320000 | Y1 | 4/2005 |
| KR | 2011 0029352 | A | 3/2011 |
| KR | 101071670 | B1 | 10/2011 |
| KR | 2012 0131010 | A | 12/2012 |
| KR | 2017 0067056 | A | 6/2017 |
| KR | 20170079314 | A | 7/2017 |
| KR | 101938225 | B1 | 1/2019 |
| WO | 2018150157 | A1 | 8/2018 |
| WO | WO-2018150157 | A1 * | 8/2018 ......... A47G 25/0607 |

OTHER PUBLICATIONS

International Search Report and Written Opinion for Application No. PCT/US2020/042261 dated Nov. 2, 2020.
International Search Report and Written Opinion issued in corresponding International Application No. PCT/US2020/053426 dated Jan. 18, 2021, 14 pages.
International Search Report and Written Opinion issued in corresponding International Application No. PCT/US2020/054898 dated Jan. 22, 2021, 14 pages.
Chinese Office Action issued by the State Intellectual Property Office of People's Republic of China in connection with International Application No. 202080064670.3, dated Mar. 1, 2023.

* cited by examiner

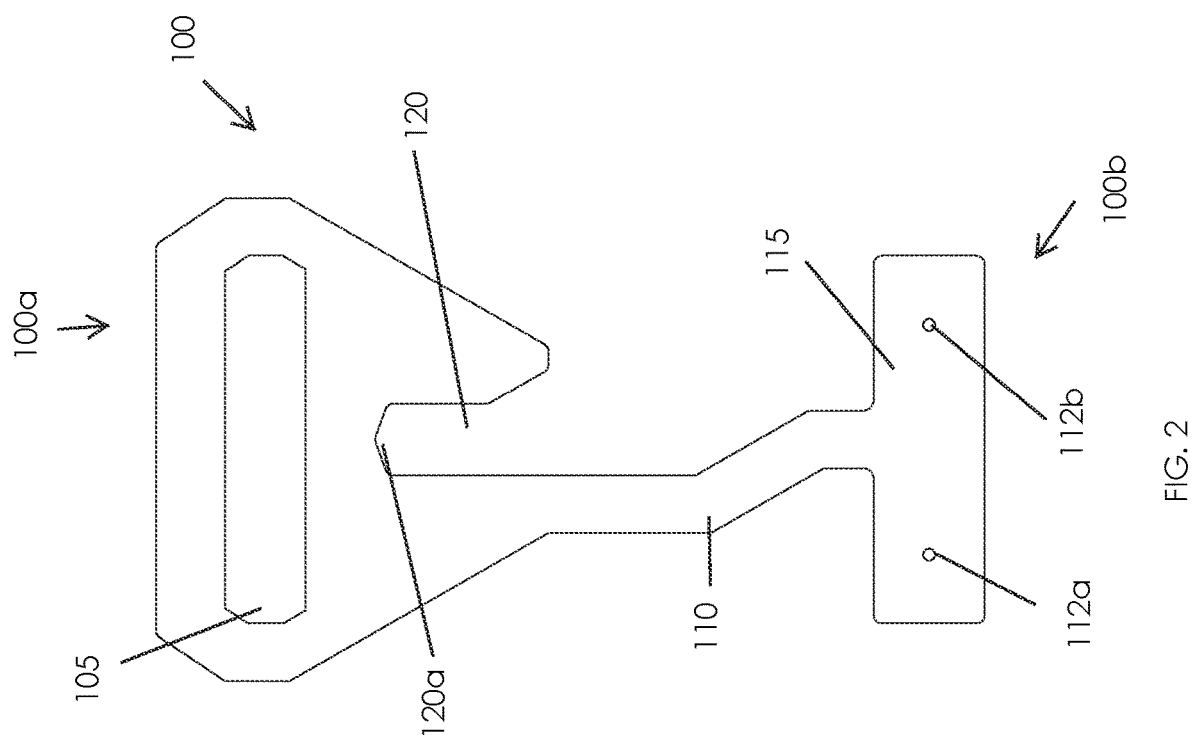

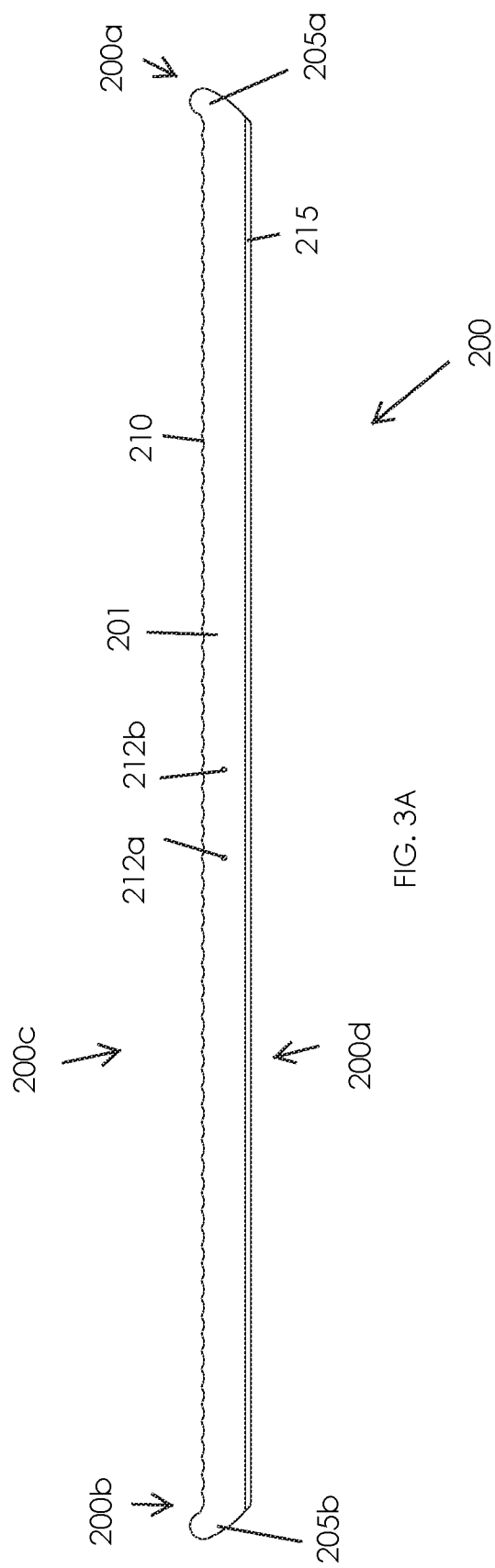
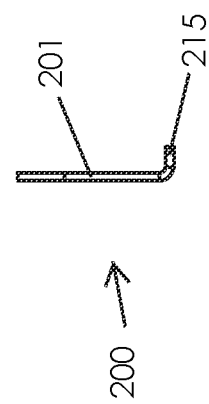
FIG. 3A
FIG. 3B

VEGETATION HANGER

CROSS-REFERENCE TO RELATED APPLICATIONS

This application is a continuation application of U.S. patent application Ser. No. 16/930,522 filed on Jul. 16, 2020, which claims the benefit of and priority to U.S. Provisional Patent Application No. 62/874,939 filed on Jul. 16, 2019, the entire contents of each of which are hereby incorporated herein by reference.

FIELD

The present disclosure generally relates to a hanger and more particularly, to a hanger for facilitating hang harvesting, transportation, drying and unloading of vegetation.

BACKGROUND

Vegetation, such as plants, herbs, flowers, hemp and/or *cannabis*, and other vegetation, are harvested, and then subsequently dried to produce a final product. Typically, during the drying process, vegetation is hung on plastic netting, which causes stress to the user and damages vegetation. This process requires the vegetation to be hung one branch at time and threaded through the netting to secure the vegetation. Removal of the vegetation also requires careful unthreading of the vegetation one branch at a time from the plastic netting. Other methods have been contemplated, such as clothing hangers, bailing wires, string and/or ropes, screens, chains, cages, fencing, and combinations thereof, all of which cause damage to vegetation and stress to the user. Therefore, there is a need to provide a method of facilitating hang harvesting, transporting, drying and unloading of vegetation without damaging the vegetation.

SUMMARY

The present disclosure relates to a hanger that includes a hanger portion and a crossbar coupled to the hanger portion to create a vegetation hanger to facilitate hang harvesting, transporting, drying and unloading of vegetation.

In one aspect, the present disclosure provides a vegetation hanger including a hanger portion and a crossbar. The hanger portion includes a first aperture, a stem, and a base. The first aperture is configured to permit handling of the vegetation hanger by a user. The stem includes a first end portion and a second end portion, and defines a second aperture. The second aperture is configured to permit hanging of the vegetation hanger from a support structure. The crossbar is coupled to the hanger portion and defines a linear plate having a first edge, a second edge, a first end portion, and a second end portion.

In aspects, the crossbar may include at least one ridge disposed along the first edge.

In aspects, the second edge of the cross bar may be bent at a predetermined angle relative to the crossbar.

In aspects, the predetermined angle may be 90 degrees.

In aspects, the first and second end portion of the crossbar may each includes a lip.

In aspects, the crossbar may be tapered from a center point between the first and second end portions outwardly towards the first and second end portion.

In aspects, the crossbar and the hanger portion may be coupled via at least one fastener.

In aspects, the first aperture may be dimensioned to receive a hand.

In aspects, the second aperture may be configured to engage one of a bar or a wire.

In aspects, the second aperture may include a V-shaped notch.

In aspects, the vegetation hanger may be formed from one or more materials selected from metal, plastic, or composite materials.

In another aspect, the present disclosure provides a method of drying vegetation on a vegetation hanger. The method includes: hanging a vegetation hanger including a hanger portion and a crossbar on a support; hanging the vegetation on a first edge of the crossbar, the crossbar having at least one ridge disposed on the first edge to prevent movement of the vegetation; and carrying the vegetation hanger via a first aperture of the hanger portion, to transport the vegetation from a first location to a second location.

In aspects, the method may further include assembling the vegetation hanger by coupling the hanger portion to the crossbar.

In aspects, the hanger portion may be coupled to the crossbar with at least one fastener.

In aspects, carrying the vegetation hanger from a first location to a second location may include transporting the vegetation from a point of harvest to a final drying location.

BRIEF DESCRIPTION OF DRAWINGS

FIG. 2 is a front view of the hanger portion of the hanger of FIG. 1;

FIG. 3A is a front view of a crossbar of the hanger of FIG. 1;

FIG. 3B is a side view of the crossbar of the hanger of FIG. 1; and

DETAILED DESCRIPTION

Figure 1:
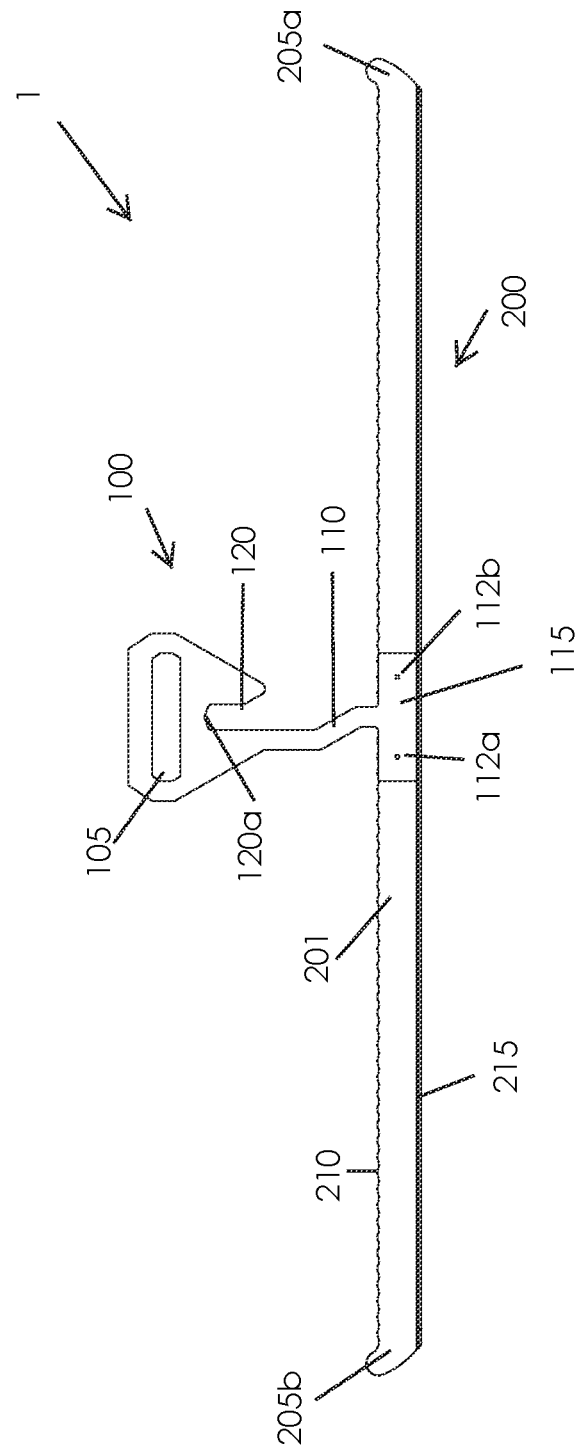
FIG. 1 is a front view of a vegetation hanger in accordance with the present disclosure.

Embodiments of the presently disclosed vegetation hanger is described in detail with reference to the drawings, in which like reference numerals designate identical or corresponding elements in each of the several views.

Referring to FIG. 1, a vegetation hanger provided in accordance with the present disclosure is shown generally identified by reference numeral 1. The vegetation hanger 1 generally includes a hanger portion 100 and a cross bar portion 200 coupled to the hanger portion 100.

As seen in FIG. 2, the hanger portion 100 has a first end portion 100*a* and a second end portion 100*b*. The hanger portion 100 includes a first aperture 105, a stem 110, and a base 115. The first aperture 105 is disposed at the first end portion 100*a* of the hanger portion 100 and is configured to facilitate handling of the vegetation hanger 1 by a user. The first aperture 105 may be dimensioned to receive a hand or one or more fingers of a user. The hanger portion 100 may be fabricated from a lightweight metal, plastic, composite material, or any other suitable material. The first end portion 100*a* may be dipped in a rubber composition, or any other suitable material to provide a comfortable grip using the first aperture. The first aperture 105 is further configured to receive a zip tie or any suitable fasteners and a body of the hanger portion 100 is configured to receive a label disposed along the body of the hanger portion 100, in which both zip tie and the label contains harvest information such as, for example, name of harvest, strain, and/or date and time of harvest, in order to facilitate labeling of the harvest.

The stem 110 extends the first end portion 100a towards a second end portion 100b defining a second aperture 120. The second aperture 120 is configured to facilitate hanging of the vegetation hanger 1 on a support or mounting surface, such as, for example, a pole, horizontal bar, hook, or rack. The second aperture 120 may be dimensioned to receive a specific support, such as for example a horizontal bar with a rectangular dimension. As another example, the second aperture 120 may have a top end portion that may include a V-shaped notch 120a at the top of the second aperture 120 to facilitate the use of the vegetation hanger 1 on wire, string, rope, plastic netting, chain, cage or fencing.

The base 115 of the hanger portion 100 is disposed at the second end portion 100b and may be coupled to the crossbar 200. The base 115 may be coupled to the crossbar 200 by ultrasonic welding, magnets, adhesive, cord, or fasteners 112a, 112b as shown. The fasteners 112a, 112b may be bolts, screws, or any other suitable fastener. The base 115 when coupled to the crossbar 200 is dimensioned to be flush with the crossbar 200.

With reference to FIGS. 3A and 3B, the crossbar 200 includes a linear plate 201 configured to facilitate the hanging of vegetation thereon. The linear plate 201 includes a first end portion 200a and second end portion 200b, a top edge 200c, and bottom edge 200d. At least a portion of top edge 200c of the linear plate 201 includes at least one ridge, or alternatively as shown, serrated or textured surface including a series or plurality of ridges 210, disposed along the top edge 200c. The series of ridges are configured to prevent vegetation from sliding off the crossbar 200 and provide organization of the vegetation on the series of ridges 210. The linear plate 201 may include openings 212a, 212b to receive the fasteners 112a, 112b to couple the crossbar 200 to the hanging portion 100. The linear plate 201 includes one or more lips 205a, 205b disposed on the first and second end portions 200a, 200b, respectively. The lips 205a, 205b are configured to prevent unintended lateral movement of the vegetation off the first and second end portion 200a, 200b. When intended, lateral movement of all the vegetation hung on the crossbar 200 at once may be initiated by a user.

With reference to FIG. 3B, the bottom edge 200d is configured to be bent to a predetermined angle such as, for example, 90 degrees, relative to the linear plate 201 to provide additional strength to the linear plate 201 in carrying vegetation on the linear plate 201.

The linear plate 201 may be fabricated at any suitable length, which, as non-limiting examples, may be one of 21", 41", or 61" to accommodate different open spaces, amount of vegetation to be dried, and support of vegetation within a drying system. The crossbar 200 may be fabricated from a lightweight metal, plastic, composite material, or any other suitable material. The vegetation hanger 1 may be configured to be flat providing a minimal thickness to allow for stacking and storage of multiple vegetation hanger(s). It should be understood that the hanger portion 100 and the crossbar 200 may be fabricated into a single unit, instead of being two components coupled to one another.

Figure 4:
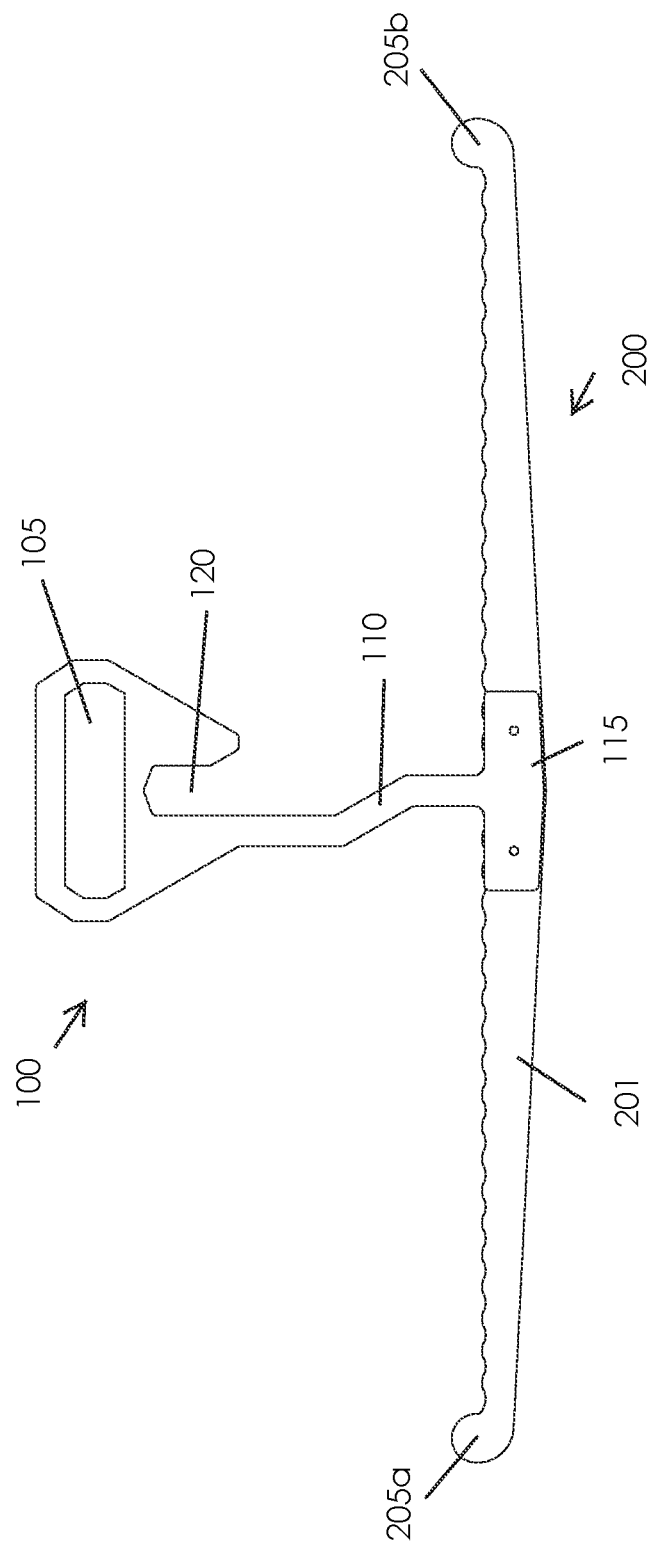
FIG. 4 is a front view of another exemplary vegetation hanger in accordance with the present disclosure.

With reference to FIG. 4, the linear plate 201 may be configured to be tapered in two directions from a center point between the first end portion 200a and the second end portion 200b outwardly towards each of the first end portion 200a and the second end portion 200b.

In operation to dry vegetation, the vegetation hanger 1, including the hanger portion 100 and the crossbar 200, is hung on a support or a mounting surface at the point of harvest. The vegetation may be cut (e.g., to about 24" in length) and hung along the top edge 200c of the crossbar 200. Each piece of harvested vegetation can be placed between adjacent ridges of the series of ridges 210 to prevent individual movement of the vegetation. Once all the vegetation has been placed on the crossbar 200 of vegetation hanger 1, the vegetation hanger 1 may be carried (e.g., by a user) via the first aperture 105 from the point of harvest to the final drying location.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A hanger for supporting vegetation thereon, comprising:
   a crossbar having a longitudinally-extending, upper-facing edge, wherein the upper-facing edge defines a plurality of alternating ridges and notches configured to support vegetation and prevent sliding of the vegetation; and
   a hanger portion extending upwardly from a central portion of the crossbar, the hanger portion defining a first aperture configured for receipt of a user's hand, and a second aperture that is separate from the first aperture and configured for receipt of a support bar, wherein the second aperture includes a V-shaped notch at a top end of the second aperture,
   wherein the crossbar has a bottom edge opposite the upper-facing edge, the bottom edge having a bent portion extending outwardly from the crossbar at a substantially 90 degree angle, the bent portion extending along substantially an entire length of the crossbar and being configured to enhance the strength of the crossbar along the length of the crossbar.

2. The hanger according to claim 1, wherein the crossbar is an elongate metal plate.

3. The hanger according to claim 1, wherein the crossbar includes opposite first and second end portions each having a lip that protrudes upwardly relative to the upper-facing edge such that the lips prevent the vegetation from sliding off of the first and second ends portions of the crossbar.

4. The hanger according to claim 1, wherein the first aperture has a length extending parallel with a length of the crossbar, and the second aperture has a length that is perpendicular to the length of the crossbar.

5. The hanger according to claim 4, wherein the second aperture is positioned below a central portion of the first aperture and above the central portion of the crossbar.

6. The hanger according to claim 4, wherein the second aperture defines a longitudinal axis that intersects a central portion of the first aperture and the central portion of the crossbar.

7. The hanger according to claim 1, wherein the second aperture is defined by a pair of parallel side walls of the hanger portion and a pair of top walls of the hanger portion that interconnect and extend between the pair of parallel side walls, the pair of top walls being connected to one another at the top end of the second aperture and being angled relative to one another to form the V-shaped notch.

8. The hanger according to claim 7, wherein the second aperture has a width defined by the pair of parallel side walls of the hanger portion.

9. The hanger according to claim 1, wherein the plurality of alternating ridges and notches of the upper-facing edge of the crossbar are arcuate.

10. The hanger according to claim 9, wherein the upper-facing edge of the crossbar is perpendicular to the hanger portion.

11. The hanger according to claim 1, wherein the crossbar is undulating along substantially an entire length of the upper-facing edge.

12. The hanger according to claim 1, wherein the crossbar is fabricated from metal.

13. A hanger for supporting vegetation thereon, comprising:
- an elongate metal plate having a longitudinally-extending, upper-facing edge, the upper-facing edge having a serrated configuration configured to support vegetation and prevent sliding of the vegetation; and
- a hanger portion extending upwardly from the elongate metal plate, the hanger portion defining a slot configured for receipt of a support bar, and an aperture configured for receipt of a user's hand, wherein the elongate metal plate includes opposite first and second end portions each having a lip that protrudes upwardly relative to the upper-facing edge such that the lips prevent the vegetation from sliding off of the first and second end portions of the elongate metal plate,
- wherein the elongate metal plate has a bottom edge opposite the upper-facing edge, the bottom edge having a bent portion extending outwardly from the elongate metal plate at a substantially 90 degree angle, the bent portion extending along substantially an entire length of the crossbar and being configured to enhance the strength of the crossbar along the length of the crossbar.

14. The hanger according to claim 13, wherein the aperture has a length that is perpendicular to a length of the slot.

15. The hanger according to claim 14, wherein the aperture is closed, and the slot is open, the aperture and the slot being separate from one another.

16. The hanger according to claim 13, wherein the slot is positioned below a central portion of the aperture and above a central portion of the elongate metal plate.

17. The hanger according to claim 13, wherein the upper-facing edge of the elongate metal plate is linear and perpendicular to the hanger portion.

\* \* \* \* \*